US011227626B1

(12) United States Patent
Krishnan Gorumkonda et al.

(10) Patent No.: US 11,227,626 B1
(45) Date of Patent: Jan. 18, 2022

(54) AUDIO RESPONSE MESSAGES

(71) Applicant: Snap Inc., Santa Monica, CA (US)

(72) Inventors: Gurunandan Krishnan Gorumkonda, Seattle, WA (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 308 days.

(21) Appl. No.: 16/418,638

(22) Filed: May 21, 2019

Related U.S. Application Data

(60) Provisional application No. 62/674,410, filed on May 21, 2018.

(51) Int. Cl.
*G10L 25/84* (2013.01)
*G06F 3/16* (2006.01)
*G06N 3/08* (2006.01)
*G10L 15/22* (2006.01)

(52) U.S. Cl.
CPC .............. *G10L 25/84* (2013.01); *G06F 3/167* (2013.01); *G06N 3/08* (2013.01); *G10L 15/22* (2013.01); *G10L 2015/223* (2013.01); *G10L 2015/226* (2013.01)

(58) Field of Classification Search
None
See application file for complete search history.

(56) References Cited

U.S. PATENT DOCUMENTS

| | | | |
|---|---|---|---|
| 10,740,391 B2 * | 8/2020 | Nichkawde | G11B 27/031 |
| 11,016,729 B2 * | 5/2021 | Andersen | G06N 3/08 |
| 2016/0099010 A1 * | 4/2016 | Sainath | G06N 3/0445 |
| | | | 704/232 |
| 2016/0260009 A1 * | 9/2016 | George | G06N 3/04 |
| 2018/0052520 A1 * | 2/2018 | Amores Llopis | G06F 3/017 |
| 2018/0232471 A1 * | 8/2018 | Schissler | G06K 9/627 |
| 2018/0232571 A1 * | 8/2018 | Bathiche | G10L 15/22 |
| 2018/0247643 A1 * | 8/2018 | Battenberg | G10L 15/02 |
| 2018/0261213 A1 * | 9/2018 | Arik | G06N 3/08 |
| 2018/0261214 A1 * | 9/2018 | Gehring | G06F 40/47 |
| 2018/0277097 A1 * | 9/2018 | Li | G10L 15/16 |
| 2018/0287968 A1 * | 10/2018 | Koukoumidis | G06F 16/248 |
| 2019/0089934 A1 * | 3/2019 | Goulden | G08B 13/19684 |
| 2019/0216333 A1 * | 7/2019 | Lai | G06F 16/55 |

* cited by examiner

*Primary Examiner* — Neeraj Sharma
(74) *Attorney, Agent, or Firm* — Schwegman Lundberg & Woessner, P.A.

(57) ABSTRACT

An audio response system can generate multimodal messages that can be dynamically updated on viewer's client device based on a type of audio response detected. The audio responses can include keywords or continuum-based signal (e.g., levels of wind noise). A machine learning scheme can be trained to output classification data from the audio response data for content selection and dynamic display updates.

18 Claims, 18 Drawing Sheets

AUDIO RESPONSE MESSAGES

PRIORITY

This application claims the benefit of priority of U.S. Provisional Patent Application Ser. No. 62/674,410, filed on May 21, 2018, which is hereby incorporated by reference herein in its entirety.

TECHNICAL FIELD

Embodiments of the present disclosure relate generally to virtual display and, more particularly, but not by way of limitation, to audio-based interactions with computational devices.

BACKGROUND

Some computers have limited computational resources. For example, smartphones generally have a relatively small screen size, limited input/output controls, and less memory and processor power than their desktop computer and laptop counterparts. Different issues arise when interacting with a computer with limited computational resources. For example, due to the limited input/out controls and small screen size, generating and interacting with dynamically updated content can be difficult.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An audio response system can generate audio response messages that monitor audio data to determine if the viewing user is interacting with the audio response system on a user device (e.g., smartphone). The audio response system can include notifications, such as text instructions, graphics, icons, that indicate to the viewing user what type of audio interaction to perform. For example, the audio response system can prompt the user to whistle loudly or whistle a certain note, or verbally speak a described keyword, and so on. In some example embodiments, what type of audio data will trigger a display of content on the audio response message is selected by the sending user. For example, a sending user that creates an audio response message can specify that the viewing user should utter or speak a keyword or whistle to unlock data on the viewing device.

The audio response system can record sound data in an audio waveform format, convert the audio waveform formatted data into visual sound data (e.g., spectrogram), and classify the visual sound data using a convolutional neural network to determine whether the recorded data includes a pre-specified type of audio interaction. If the pre-configured audio interaction is detected, additional actions can be performed, such as music being played on the viewing user's device or overlay content being display on the viewing user's device.

Figure 1:
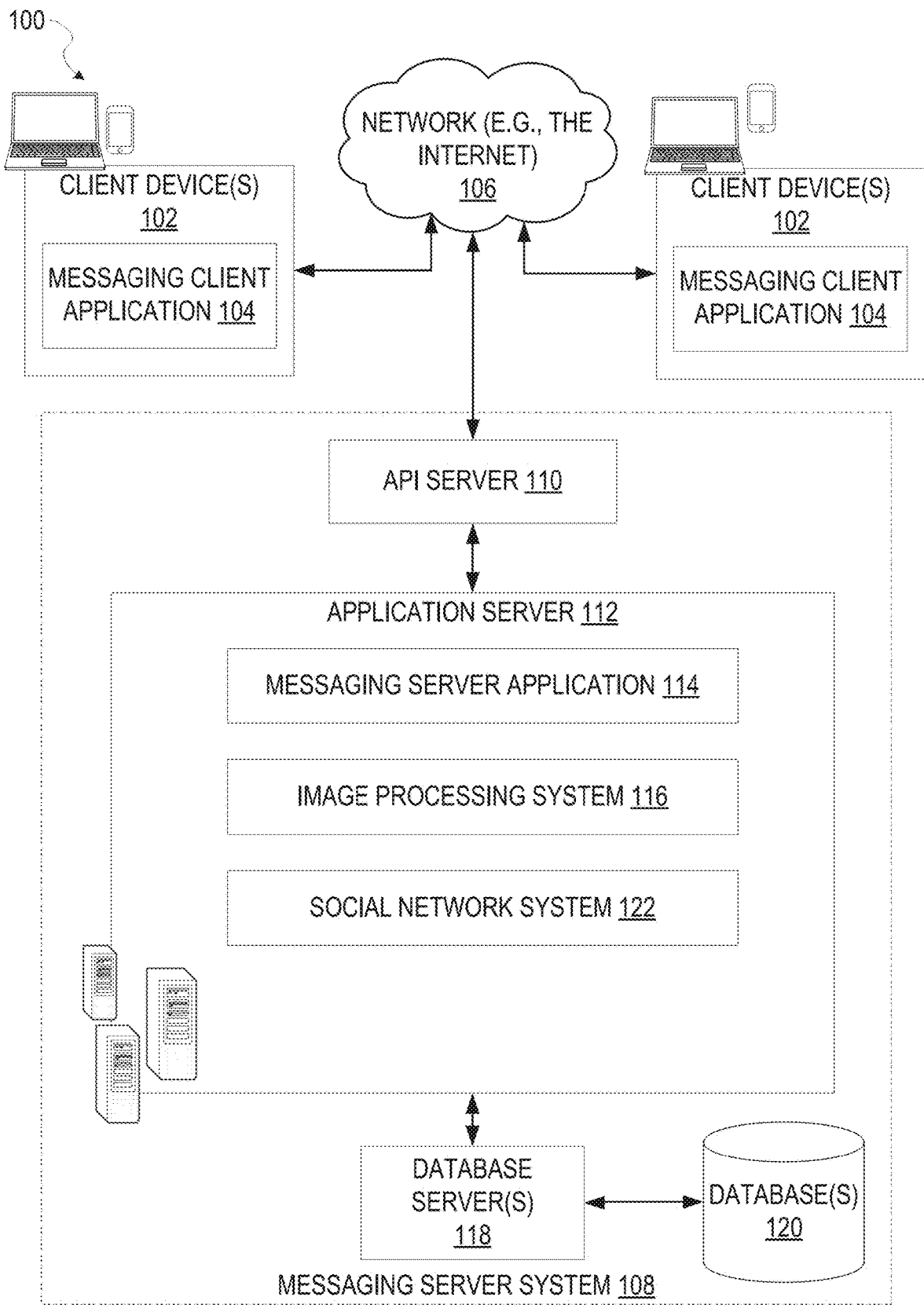
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
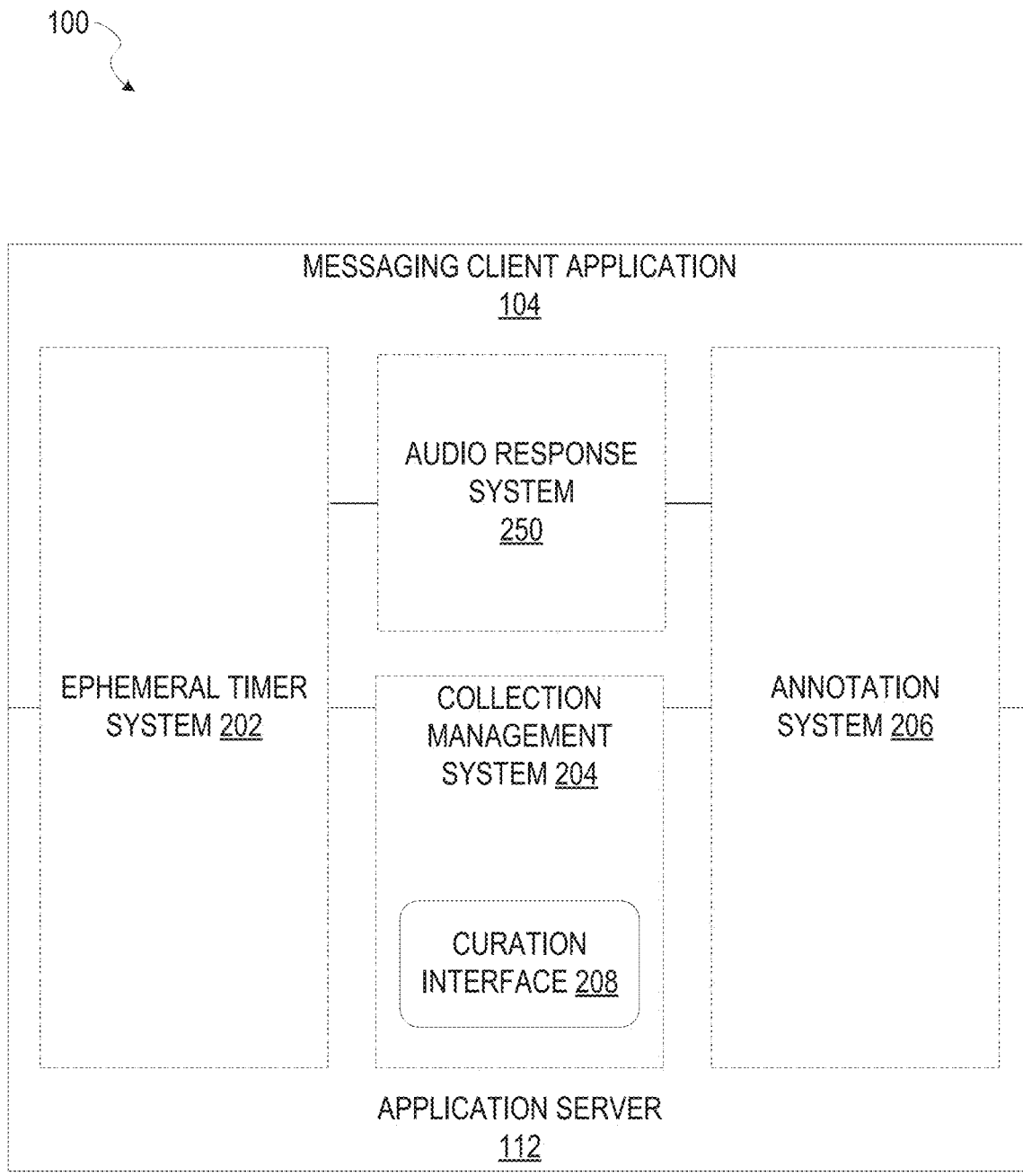
FIG. 2 is block diagram illustrating further details regarding a messaging system having an integrated virtual object machine learning system, according to example embodiments.

FIG. 2 is block diagram illustrating further details regarding the messaging system 100, according to example embodiments.

Specifically, the messaging system 100 is shown to comprise the messaging client application 104 and the application server 112, which in turn embody a number of subsystems, namely an ephemeral timer system 202, a collection management system 204, an annotation system 206, and an audio response system 250.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a sequential ephemeral message story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The audio response system 250 manages interactions with audio response ephemeral messages, as discussed in further detail below.

Figure 3:
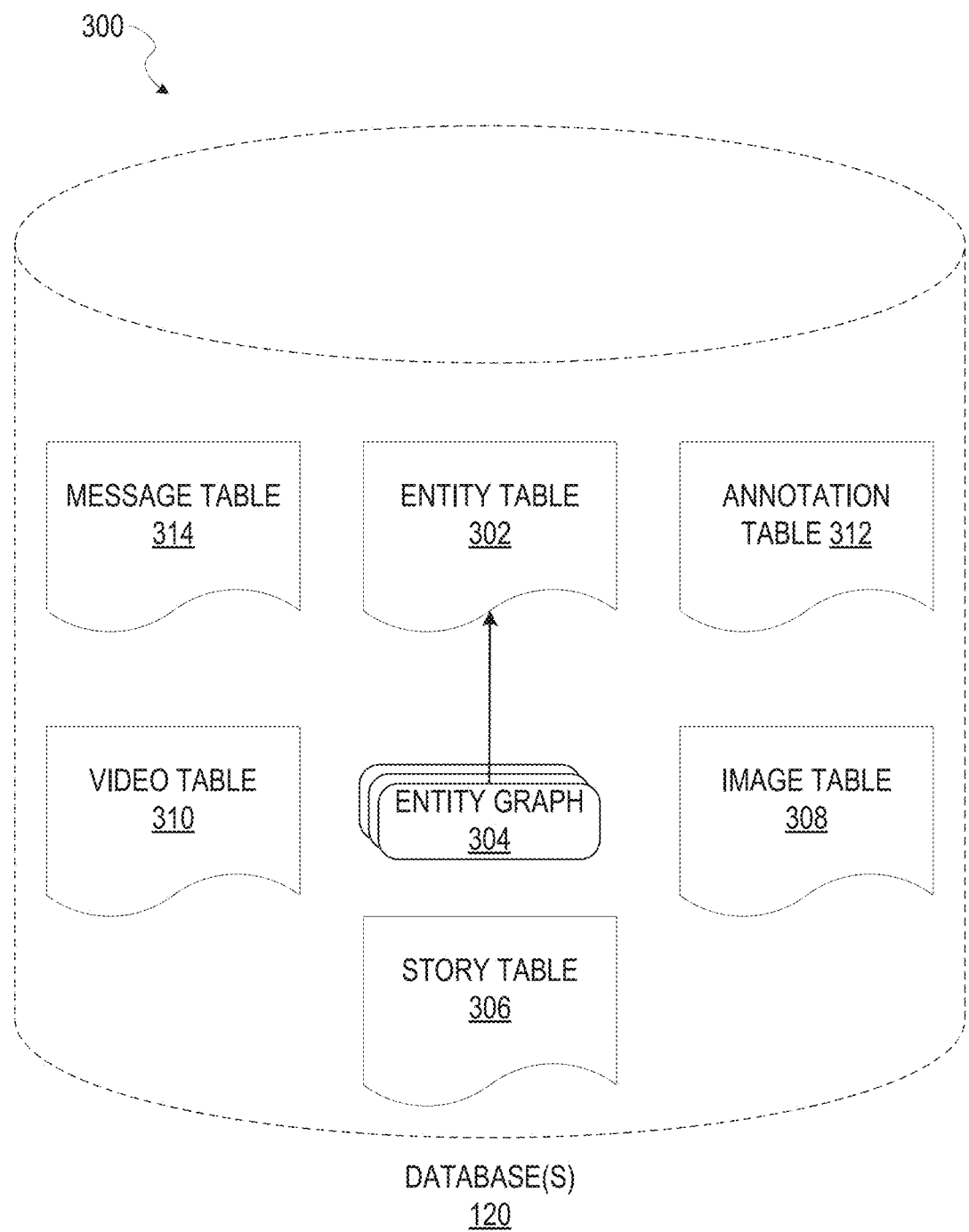
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video. In some example embodiments, the lens is stored as lens metadata which is retrievable as content (e.g., cartoon cake 1100 discussed below), discussed in further detail below.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
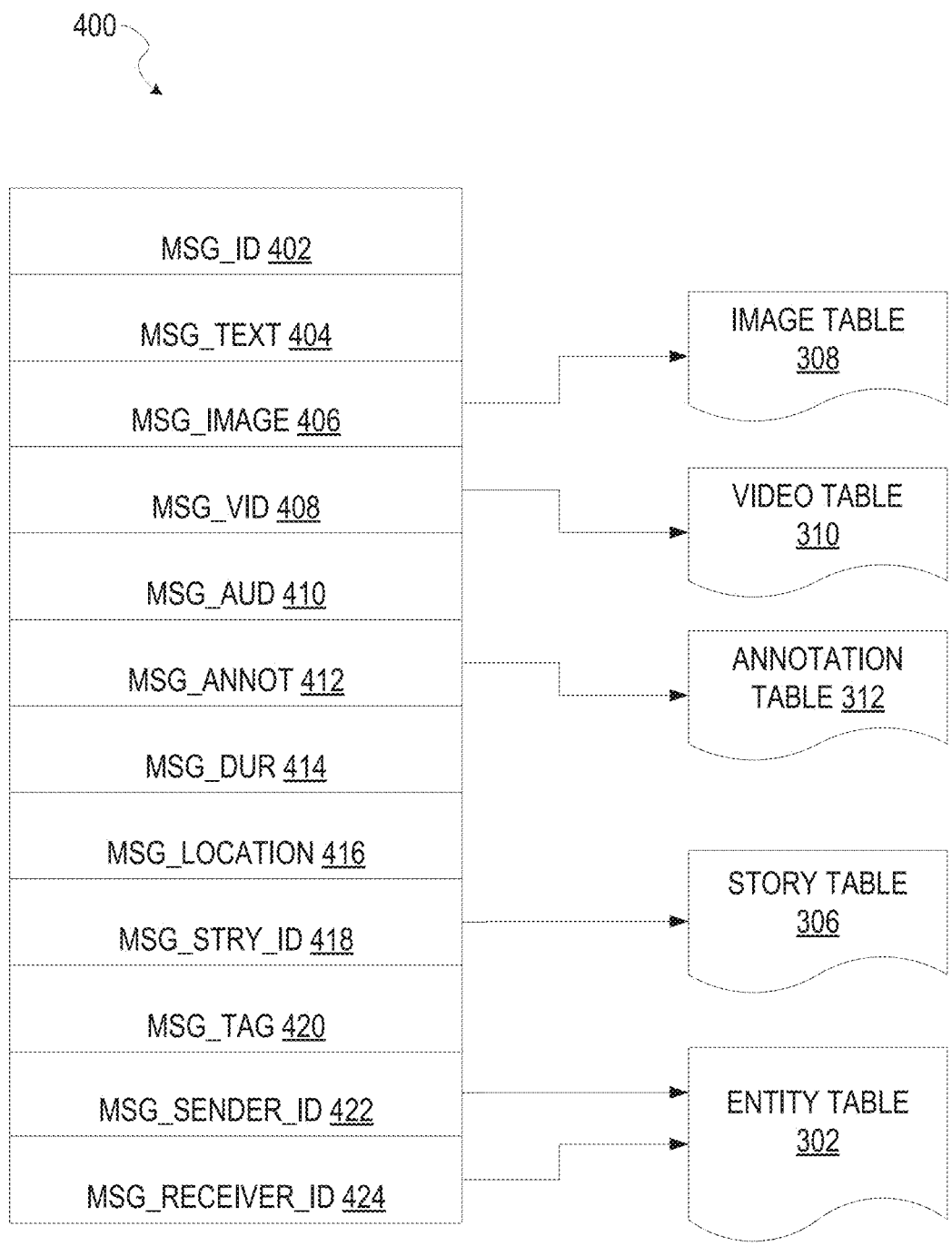
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text to be generated by a user via a user interface of the client device 102 and that is included in the message 400.

A message image payload 406: image data captured by a camera component of a client device 102 or retrieved from memory of a client device 102 and included in the message 400.

A message video payload 408: video data captured by a camera component or retrieved from a memory component of the client device 102 and included in the message 400.

A message audio payload 410: audio data captured by a microphone or retrieved from the memory component of the client device 102 and included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
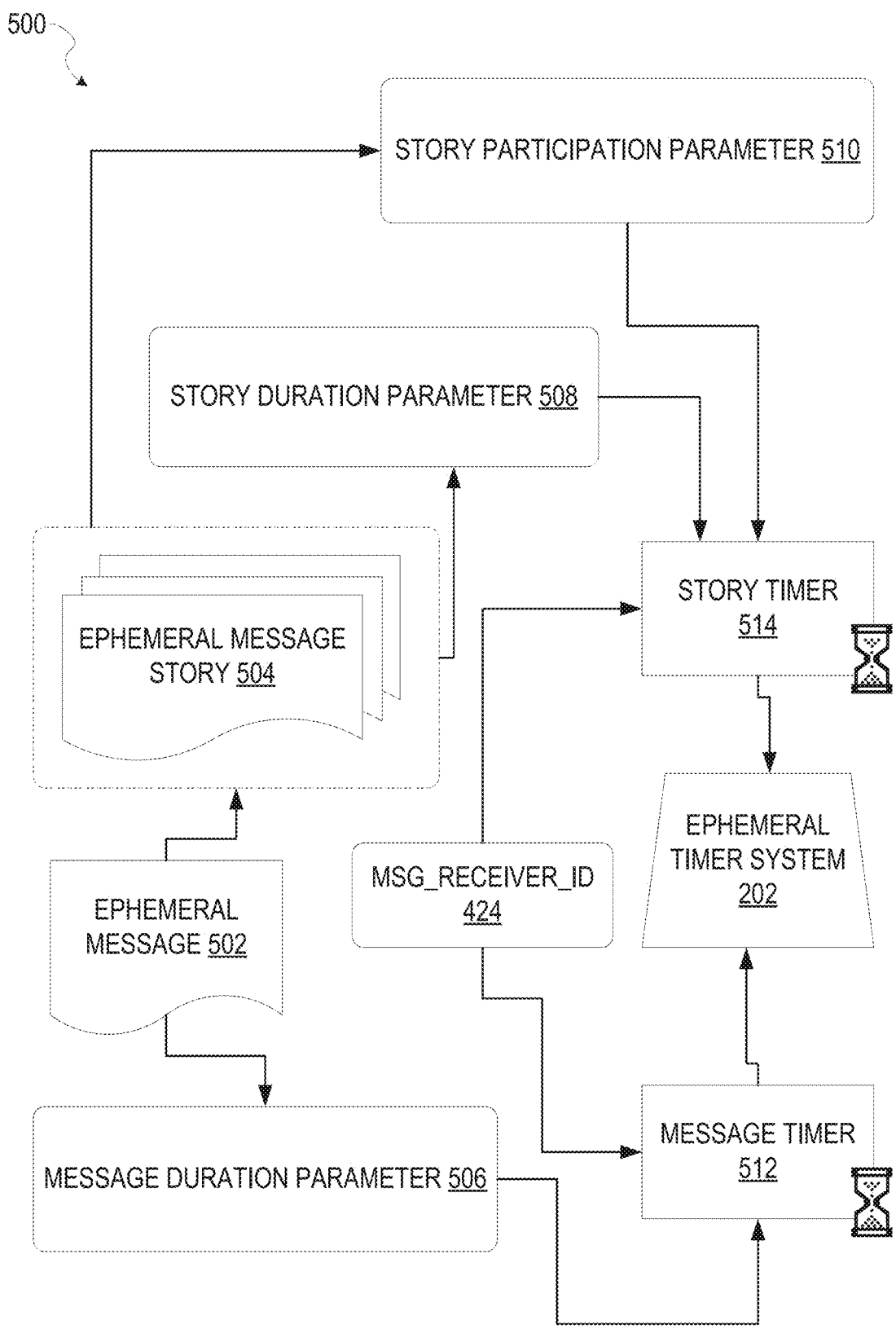
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
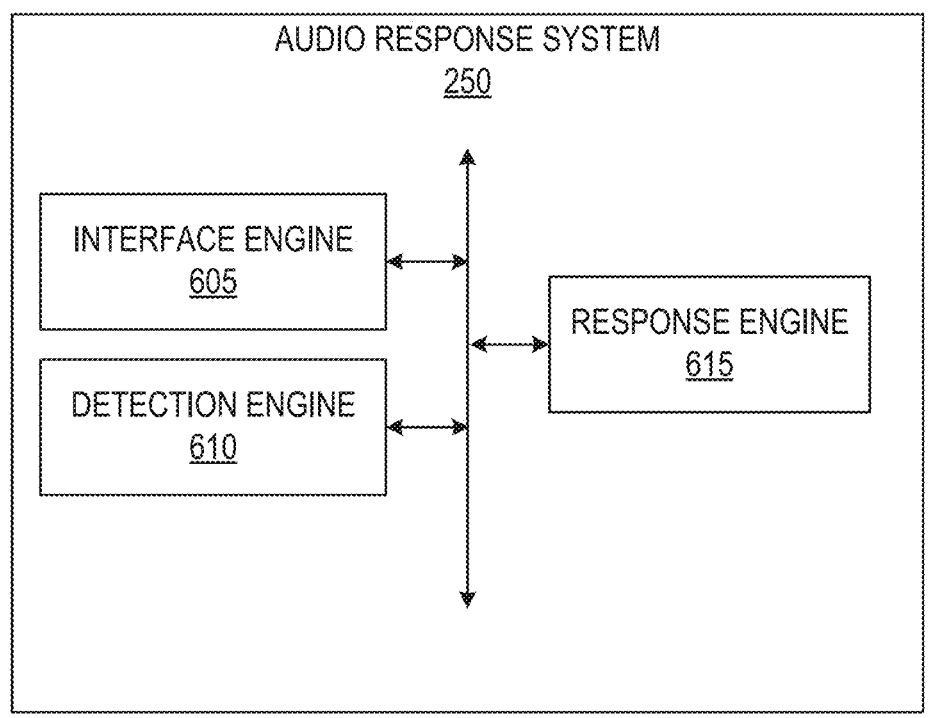
FIG. 6 shows internal functional components of an audio response system, according to some example embodiments.

FIG. 6 shows internal functional engines of an audio response system 250, according to some example embodiments. As illustrated, the audio response system 250 comprises an interface engine 605, a detection engine 610, and a response engine 615. The interface engine 605 manages generating audio response ephemeral message data for transmission and display on another client device. For example, the interface engine 605 can present a user of a client device one or more options for a type of audio responsive message to generate and transmit to another client device for display. The detection engine 610 manages detecting audio responses from a recipient user viewing the audio response ephemeral message on their client device. For example, the detection engine 610 can implement a machine learning scheme (e.g., a convolutional neural network) to detect a type of audio response created by (e.g., uttered by, emanating from) a recipient user that is viewing the audio response message. The response engine 615 manages selection and display of content in response to the type of audio response detected by the detection engine 610. For example, in response to the detection engine 610 detecting a preselected keyword, the response engine 615 displays one or more items of content as part of an ephemeral message for display on the recipient's client device, and/or publication to a social network site. As an additional example, in response to the detection engine 610 detecting sound noise from the user blowing air, the response engine 615 displays a cartoon cake with candles flickering on the user's client device.

Figure 7A:
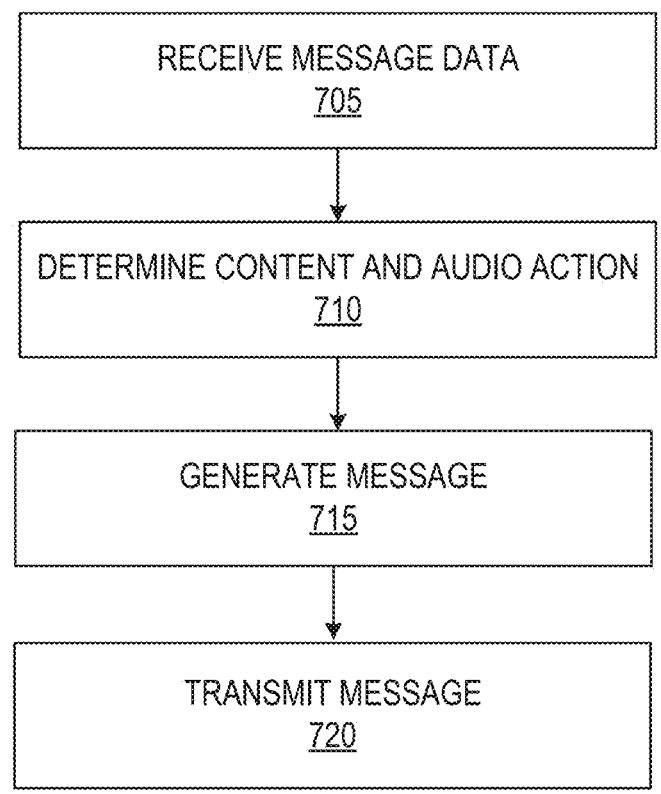
FIG. 7A-7C show flow diagrams of methods for interacting with audio response ephemeral messages, according to some example embodiments.
Figure 7B:
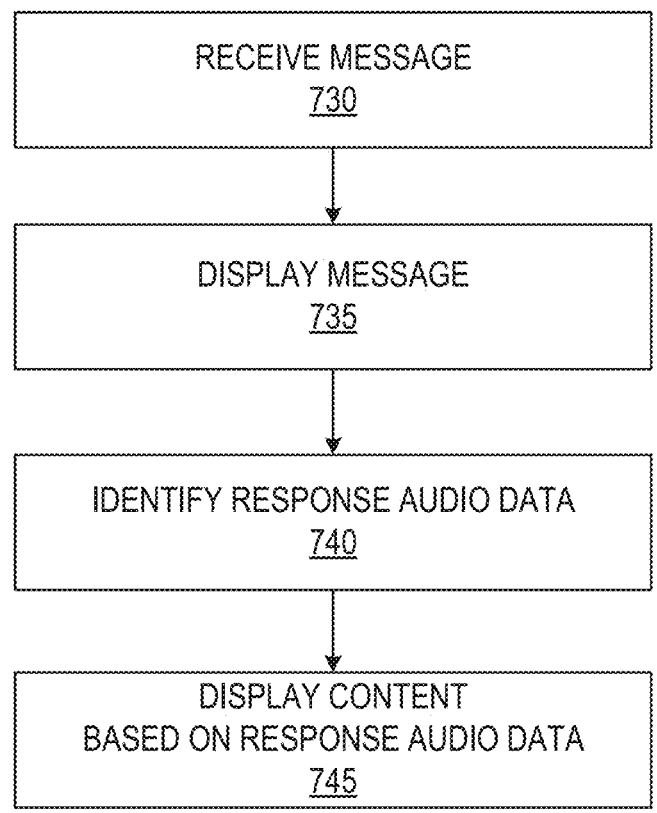
Figure 7C:
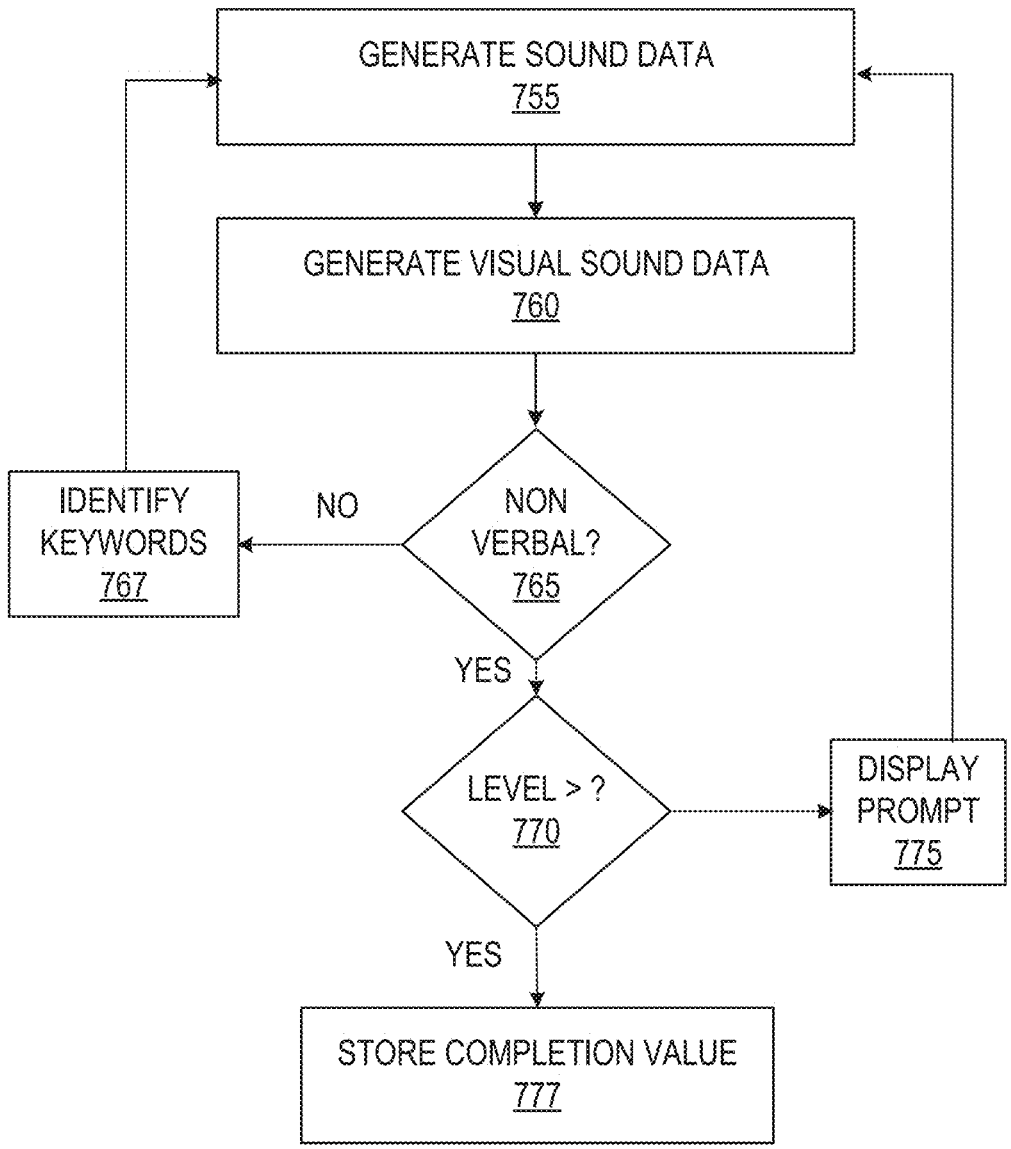

FIG. 7A-7C show flow diagrams of methods for interacting with audio response ephemeral messages, according to some example embodiments. In the illustrated example, method 700 of FIG. 7A is performed by a sending user via his/her client device (an instance of system 250 executing on the sending user's device) to generate the audio response message for interaction, and methods 725 and 750 (of FIG. 7B, 7C respectively) are performed by a recipient user via his/her client device (another instance of system 250 on the sending user's device) to interact with the audio response message using audio interactions (e.g., blowing on the phone, snapping fingers, whistling, speaking keywords).

With reference to method 700 of FIG. 7A, at operation 705, the interface engine 605 receives message data from the first client device for construction of an audio response ephemeral message. For example, at operation 705 the interface engine 605 may use an image capture sensor (e.g., a CCD sensor, a CMOS sensor) and a transducer (e.g., a microphone) to record video data of a first user singing a song, such as "Happy Birthday".

At operation 710, the interface engine 605 determines content to include in an audio response message. In some example embodiments, the user selects the audio response message type as a birthday message type using a user interface button displayed on the display screen of the client device. In some example embodiments, the interface engine 605 is configured to detect which type of message should be displayed based on what the first user is recording. For example, the interface engine 605 may use a machine learning scheme (e.g., recursive neural network trained using word embeddings) to detect that the happy birthday melody is being sung, and responsive to the detection, generate a birthday type audio response message with associated content for display (e.g., a birthday cake with candles that animate upon detection of wind noise).

At operation 715, the interface engine 605 generates an audio response ephemeral message comprising the generated image content (e.g., video data of the user singing and content data including the cake animation content or a reference to a local or remote storage location of the cake animation content). At operation 720, the interface engine 605 transmits the audio response ephemeral message (e.g., transmission to another user device of a recipient user, or publishes the audio response ephemeral message to a social network site for access by other users).

With reference to method 725 in FIG. 7B, at operation 730, the interface engine 605 (executing in another instance of system 250 on the recipient's user device) receives the audio response ephemeral message. At operation 735, the interface engine 605 displays the audio response ephemeral message. The display of the audio response ephemeral message may include the video of the sending user singing and one or more indications to perform an audio interaction with the recipient user's client device. For example, the audio response ephemeral message can contain text the prompts the recipient user to blow air towards the screen displaying the audio response ephemeral message.

At operation 740, the detection engine 610 identifies audio data created in response to viewing the audio responsive ephemeral message. Continuing the example, the audio response ephemeral message includes an instruction to prompt the recipient user to blow air onto the client device in an attempt to extinguish cartoon candles being displayed as part of the audio responsive ephemeral message. In some example embodiments, upon the audio response ephemeral message being activated (e.g., displayed), the detection engine 610 implements a convolutional neural network to analyze sound data generated by the viewing device and determine whether the sound data includes wind sounds (e.g., wind noise generated by the user blowing air past the microphone of the user device). At operation 745, in response to sound data including a pre-configured type (e.g., wind sounds), the response engine 615 corresponding content, such as a cake animation with candles flickering in response to virtual wind currents.

FIG. 7C shows an example method 750 for detecting audio response data, according to some example embodiments. In the example of method 750, the detection engine 610 is configured to identify non-verbal sounds (e.g., wind noise, whistling, popping noises) at different intensities, and further configured to generate a success or completion value if a pre-configured non-verbal sound is detected at a pre-configured intensity. In some example embodiments, the method 750 is implemented as a sub-routine of operation 740 in FIG. 7B, in which audio response data is identified.

At operation 755, in response to the audio response ephemeral message being displayed on the recipient's user device, the detection engine 610 generates sound data. For example, the detection engine 610 initiates a transducer (e.g., microphone) of the user device to record sound waveform data (e.g., .wav format files, .mp3 format files) of the ambient or surrounding environment of the recipient user's device. At operation 760, the detection engine 610 identifies the stored sound waveform data and converts the sound waveform data into visual sound data, such as a spectrogram.

At operation 765, the detection engine 610 determines whether the recorded sound data is non-verbal data (e.g., wind, whistling) or verbal data (e.g., spoken words). Upon determining that the sound data includes verbal data, the method 750 continues to operation 767 in which keywords are identified, and the method 750 loops to operation 755 for further processing, according to some example embodiments. In some example embodiments, keywords do not initiate further processes and operation 767 is omitted. For example, if at operation 765 the detection engine 610 determines that the sound data does not contain the pre-configured non-verbal sound, the method 750 proceeds directly to operation 755 for further monitoring (skipping operation 767 in FIG. 7C).

In contrast, if at operation 765 the detection engine 610 determines that the visual sound data contains non-verbal sound data, then then at operation 770 the detection engine 610 further determines whether the non-verbal data satisfies a pre-configured intensity level. For example, if at operation 765 the detection engine 610 determines that the visual sound data contains wind noise, then at operation 770 the detection engine 610 determines whether the wind noise is loud wind noise (e.g., high amplitude sound data of wind noise). If the non-verbal data does not satisfy the intensity threshold, then at operation 775 the detection engine 610 causes display of a notification to prompt the user to increase the intensity of the audio interaction (e.g., a popup window containing the text "blow harder!"). After operation 775, the method 750 continues to operation 755 for further monitoring. Alternatively, if the detection engine 610 at operation 770 determines that the intensity level is satisfied (e.g., the wind noise is sufficiently loud or intense), then at operation 777 the detection engine stores a completion value to indicate that the pre-configured non-verbal sound of a pre-configured intensity was detected. In some example embodiments, after operation 777, the subroutine terminates and the response engine 615 identifies the completion value of operation 777 or keywords of operation 767 and displays corresponding content associated with the detected data.

Figure 8A:
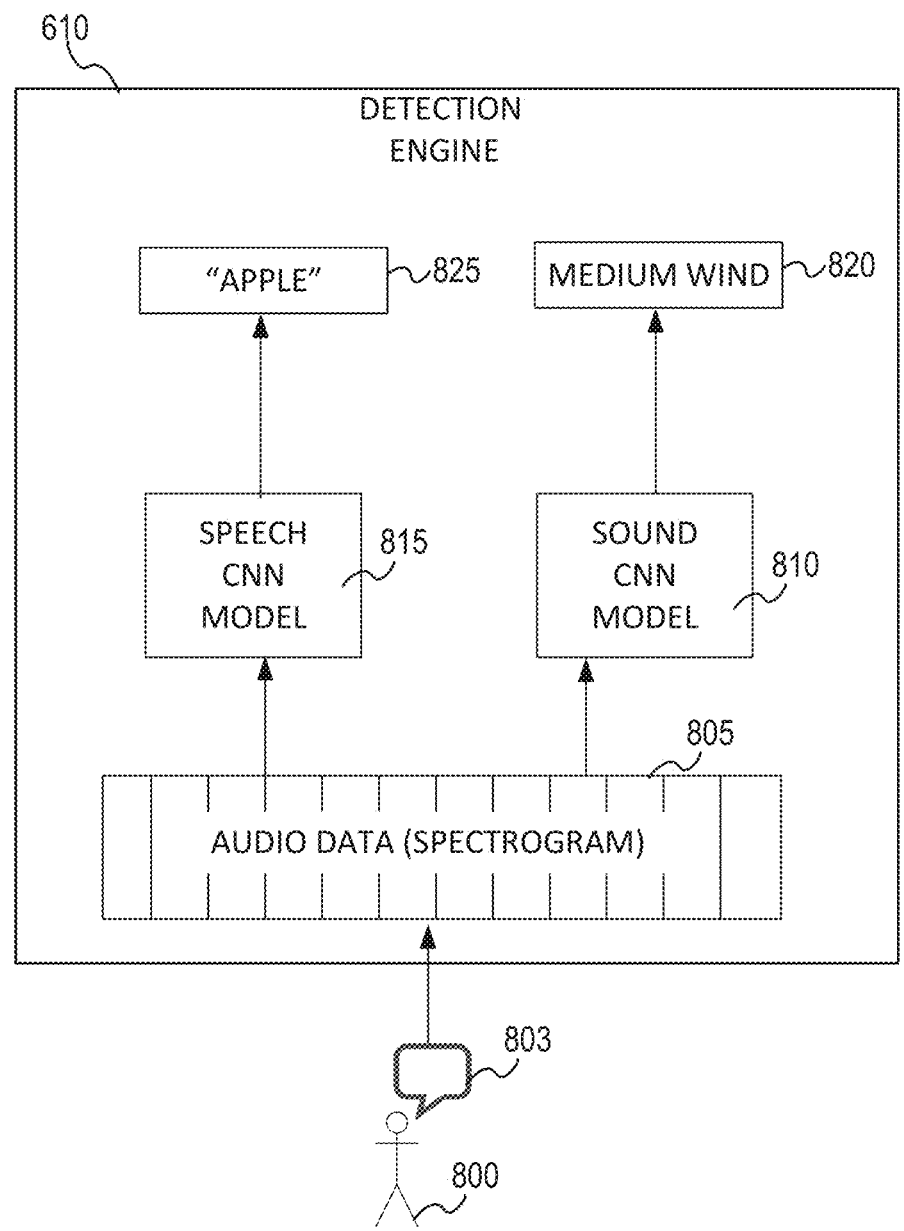
FIG. 8A-8B show machine learning implementations for audio response ephemeral messages, according to some example embodiments.

FIG. 8A shows an example configuration of detection engine 610, according to some example embodiments. In some example embodiments, the detection engine 610 comprises two models: a sound convolutional neural network model 810 and a speech convolutional neural network model 815. The sound convolutional neural network model 810 is trained on Mel spectrogram data to detect ambient environment sounds or non-verbal sounds.

Figure 8B:
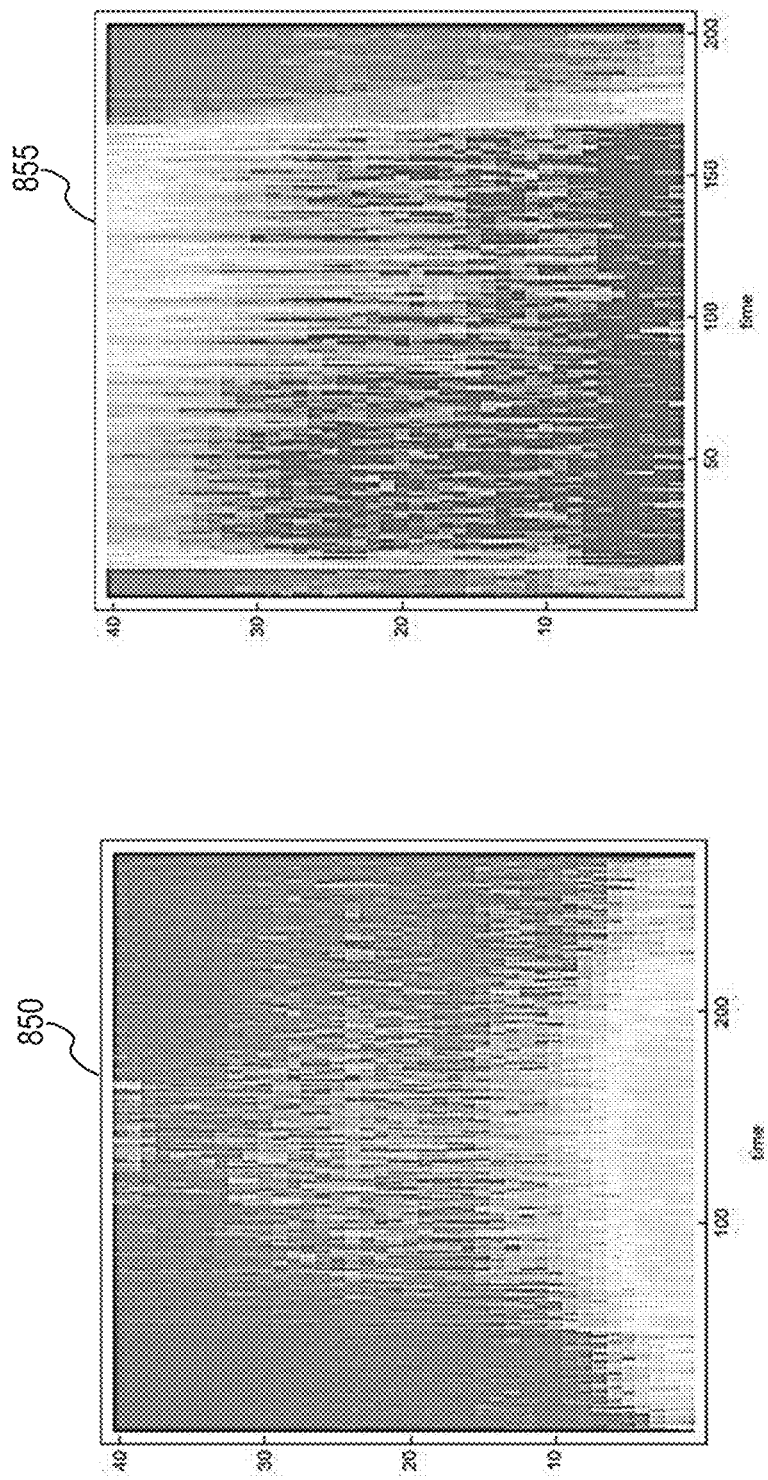

FIG. 8B shows an example of mel spectrogram data for training and detection. Generally, spectrogram data is a visual image of frequency of the sound plotted vertically over time plotted horizontally, and a mel spectrogram is spectrogram mapped to the mel scale spectrum for human auditory based sounds. Mel spectrogram 850 is visual sound data from a recording of wind blowing past a microphone at low intensity, and mel spectrogram 855 is visual sound data from a recording of wind blowing past a microphone at high intensity.

In some example embodiments, the sound convolutional neural network model 810 is an image classification neural network trained to detect non-verbal sounds, where the training data includes images of the non-verbal sounds to be detected in mel spectrogram format (e.g., mel spectrograms of low intensity wind, medium intensity wind, high intensity wind, loud slapping sound, soft clapping sound, high pitched note of a human whistling, low pitched node of a human whistling, and so on.). In some example embodiments, the sound convolutional neural network 810 is trained only on images of wind noise intensity spectrograms and the detection engine 810 only generates likelihoods that recorded sound (e.g., recorded while the audio response ephemeral message is displayed) is of a wind noise type. For example, the training data can comprise visual sound spectrograms of non-verbal sounds at 10 different intensities, and the sound convolutional neural network 810 processes any input data (e.g., a spectrogram comprising verbal data, a spectrogram comprising whistle data, a spectrogram comprising wind noise from wind currents from the weather, etc.) and generates numerical likelihoods that the input data falls into the trained intensity categories for that type of sound. Further, although verbal and non-verbal are discussed here as examples, it is appreciated that non-verbal is only an example and the intensity training approaches can applied to spoken word data as well, according to some example embodiments. For example, the sound convolutional neural network can be trained to determine whether the viewing user is whispering the word "apple" or yelling the word "apple".

In some example embodiments, the mel spectrogram data is further processed to generate mel-frequency cepstral coefficients (MFCC) data by applying discrete cosine transfer (DCT) to mel spectrum data. In some example embodiments, the speech convolutional neural network model 815 is an image classification convolutional neural network trained to generate keyword classification data 825, where the training data includes images of the keywords to be detected in MFCC format.

In the illustrated example of FIG. 8A, a user 800 generates a sound 803 (e.g., a spoken word, a whistle, wind noise). The sound 803 is recorded by a microphone and converted into visual sound data 805 (e.g., a spectrogram). In some example embodiments, the visual sound data 805 is then input into the sound convolutional neural network model 810 to generate classification data 820 describing whether the visual sound data is of a specified non-verbal sound, what intensity, and so on. In some example embodiments, the sound convolutional neural network model 810 is trained on a plurality of non-verbal sounds (e.g., individual spectrogram files of a non-verbal sound type at different intensities), and the classification data 820 is a ranking of likelihoods that the visual sound data 805 falls into each of the trained non-verbal sounds (e.g., high wind noise=90% similarity score, low wind noise 10% similarity score, and so on).

In some example embodiments, the visual sound data 805 (e.g., after being further processed by converting mel spectrogram data into MFCC data) is input into the speech convolutional neural network model 815 to generate a classification indicating keywords in the sound data.

In some example embodiments, the audio response ephemeral message identifies which model (e.g., the sound convolutional neural network model 810 or the speech convolutional neural network model 815) to implement to detect the sending user's selections. For example, the audio response message is a birthday type (with wind responsive elements), then sound convolutional neural network model 810 is implemented, whereas if the audio response message is of a keyword type (e.g., a keyword guessing game), then a speech convolutional neural network model 815 is implemented.

Figure 9:
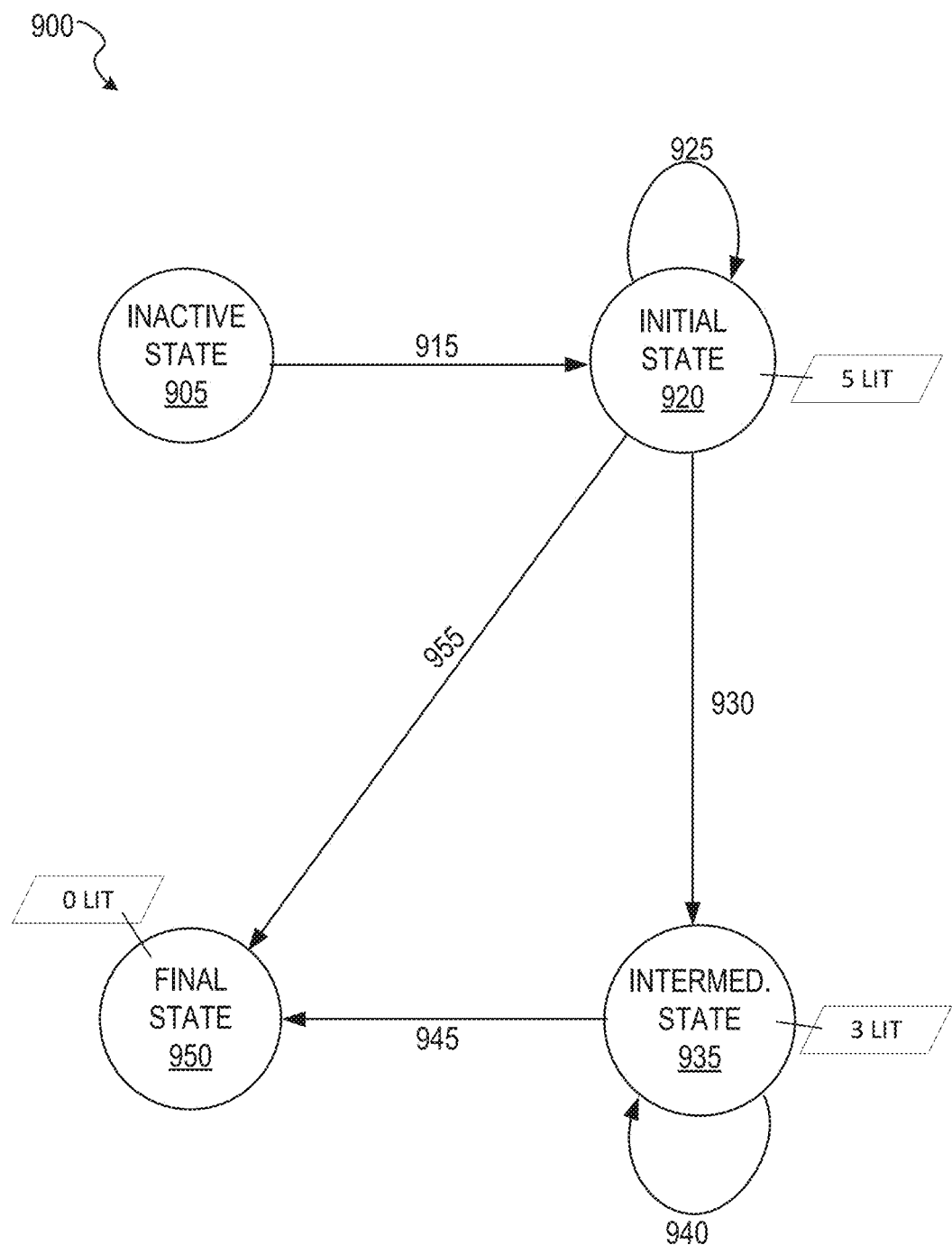
FIG. 9 shows a finite state mechanism for content of an audio response system, according to some example embodiments.

FIG. 9 shows an example finite state machine of the audio response system 250, according to some example embodiments. In some example embodiments, each sound intensity type can trigger different content for display. For example, if a user blows medium intensity wind, one type of content is triggered (e.g., unlocked, displayed), whereas if the user blows high intensity wind, a different type of content is triggered. The finite state machine (FSM) 900 tracks content in multi-intensity sound implementations. The FSM 900 comprises an inactive state 905, an initial state 920, an intermediate state 935, and a final state 950. In the inactive state 905, the detection engine 610 does not record audio data and the response engine 615 does not display content.

Upon the generated audio response ephemeral message being published, transmitted, or opened for viewing on a client device (e.g., displayed on a recipient's device, the audio response system 250 transitions 915 to the initial state 920. In the initial state 920, the detection engine 610 is activated to classify audio data generated by the recipient user and displays default content associated with the initial state (e.g., five candles lit on a birthday cake). In some example embodiments, so long as the response engine 615 is not triggered by preselected keywords or thresholds (e.g., level of noise intensity), the audio response system 250 remains in the initial state 920, as indicated by loop 925.

In response to the response engine 615 detecting audio trigger data of the intermediate state 935, the audio response system 250 transitions 930 to the intermediate state 935. In the intermediate state 935, the response engine 615 displays new content on the display device as part of the audio response ephemeral message. For example, if in the initial state 920, the user blows air of medium intensity towards the direction of the client device, the audio response system 250 in the intermediate state 935 animates a portion but not all of the candles as being extinguished (e.g., extinguishes all but two candles). So long as the user does not perform any further actions, the audio response system 250 remains in the intermediate state 935 as indicated by loop 940, according to some example embodiments.

If the user performs additional actions (e.g., blowing harder into a microphone of the client device) the audio response system 250 transitions 945 to the final state 950 where the response engine 615 displays new content pre-associated with the final state 950. For example, in the final state 950, the response engine 615 displays a birthday cake as having all of its candles extinguished.

As indicated by transition 955, in some example embodiments, the response engine 615 transitions directly from the initial state 920 to the final state 950. For example, a user that is viewing a birthday cake with all candles alight, may blow very hard thereby causing the audio response system 250 to transition 955 to the final state 950 in which the birthday cake is displayed with all candles having been extinguished, thereby skipping the intermediate state and content associated with the intermediate state 935.

Figure 10:
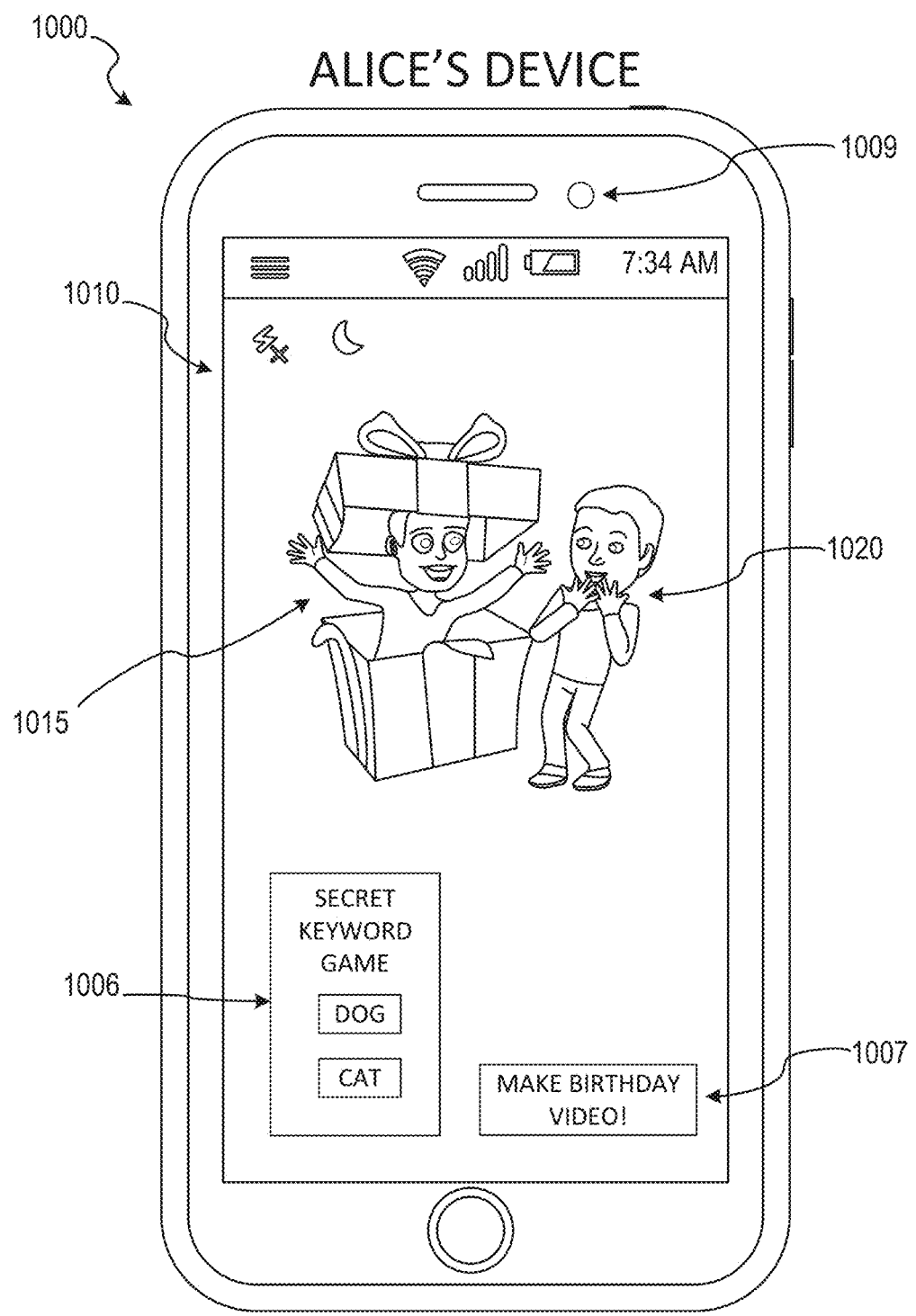
FIGS. 10-13 show user interfaces for audio response ephemeral messages, according to some example embodiments

FIGS. 10-13 show example user interfaces for generation and display of audio response ephemeral messages, according to some example embodiments. FIG. 10 shows an example client device 1000 of a first user (e.g., "Alice", a sending user) while the first user generates the audio response ephemeral message. As illustrated, the client device 1000 includes an interactive touchscreen display 1010 that the first user can use to generate an audio response ephemeral message. For example, the first user may select the user interface button 1007 to display a cartoon avatar image of the first user 1015 interacting with a cartoon avatar image of the second user 1020 in a celebratory context.

As an additional example, the first user can select button 1006 to create a keyword type audio response ephemeral message. For instance, the first user can select a keyword "DOG" then record a video via camera 1009 to include in the message of the first user describing or acting out dog like traits (to provide hints of the secret keyword to guess). The viewing user's device then monitors audio data and determines whether the viewing user guess the secret keyword correctly via analysis of visual audio data spoken by the viewing user (e.g., MFCC data of the viewing user saying "dog"). In some embodiments, the sending user can select a non-verbal audio trigger for the message. For example, the user can specify via UI buttons whether the cake candles should extinguish in response to high intensity wind, low intensity wind, whistling sounds, a snapping sound, and so on, to more finely customize how a viewing user will interact with the audio response ephemeral message.

Figure 11:
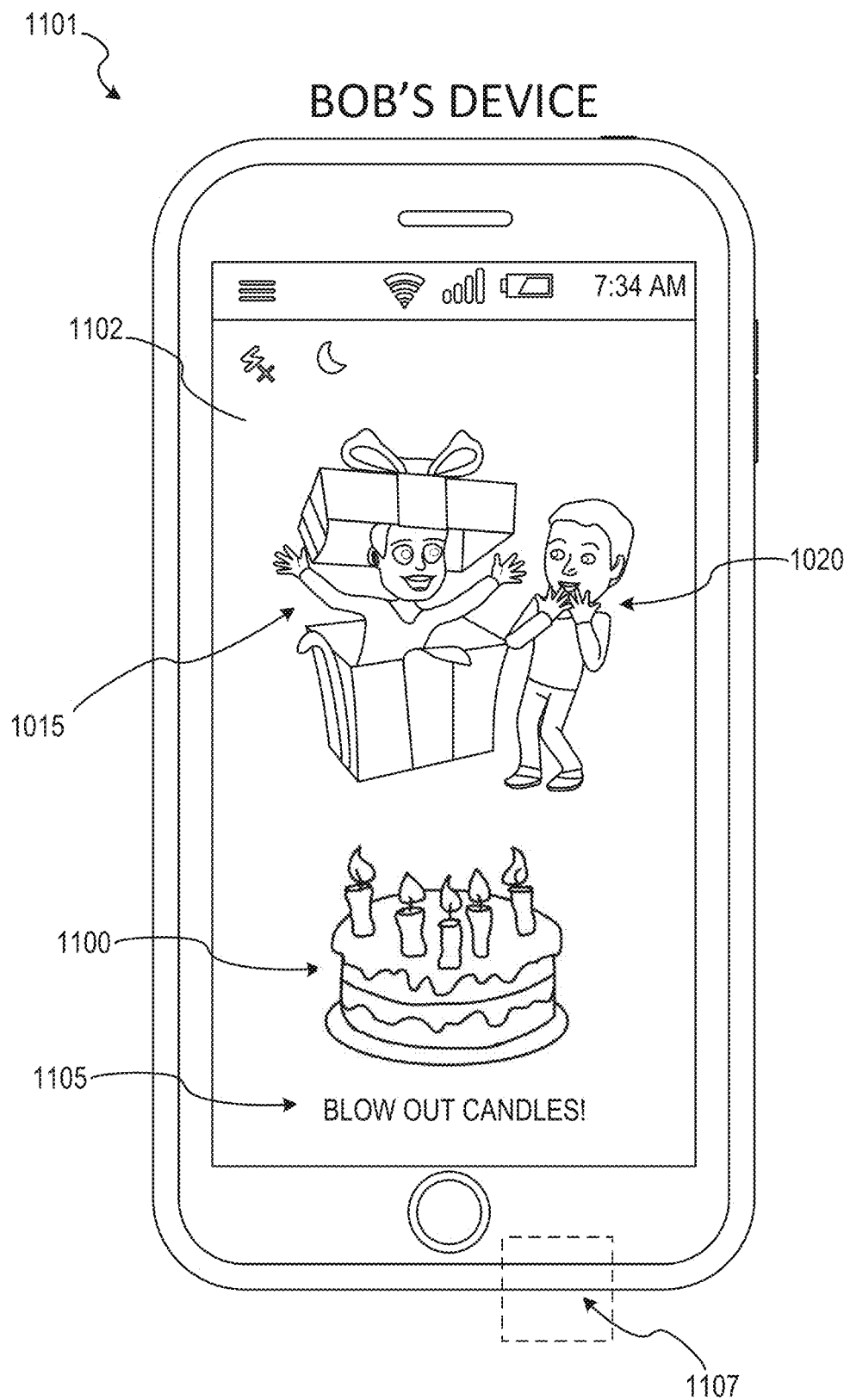

FIG. 11 shows a client device 1101 of a second user (e.g., "Bob") displaying the generated audio response ephemeral message 1102, according to some example embodiments. audio response ephemeral message 1102 includes an instruction 1105 that prompts the second user to interact with content of the audio response ephemeral message 1102. For example, the instruction 1105 prompts the user to blow towards a cartoon cake 1100 to extinguish the cartoon candles on the cake. When the second user blows towards the client device 1101, a bottom side microphone 1107 records audio data for input and classification by the detection engine 610 as discussed above.

Figure 12:
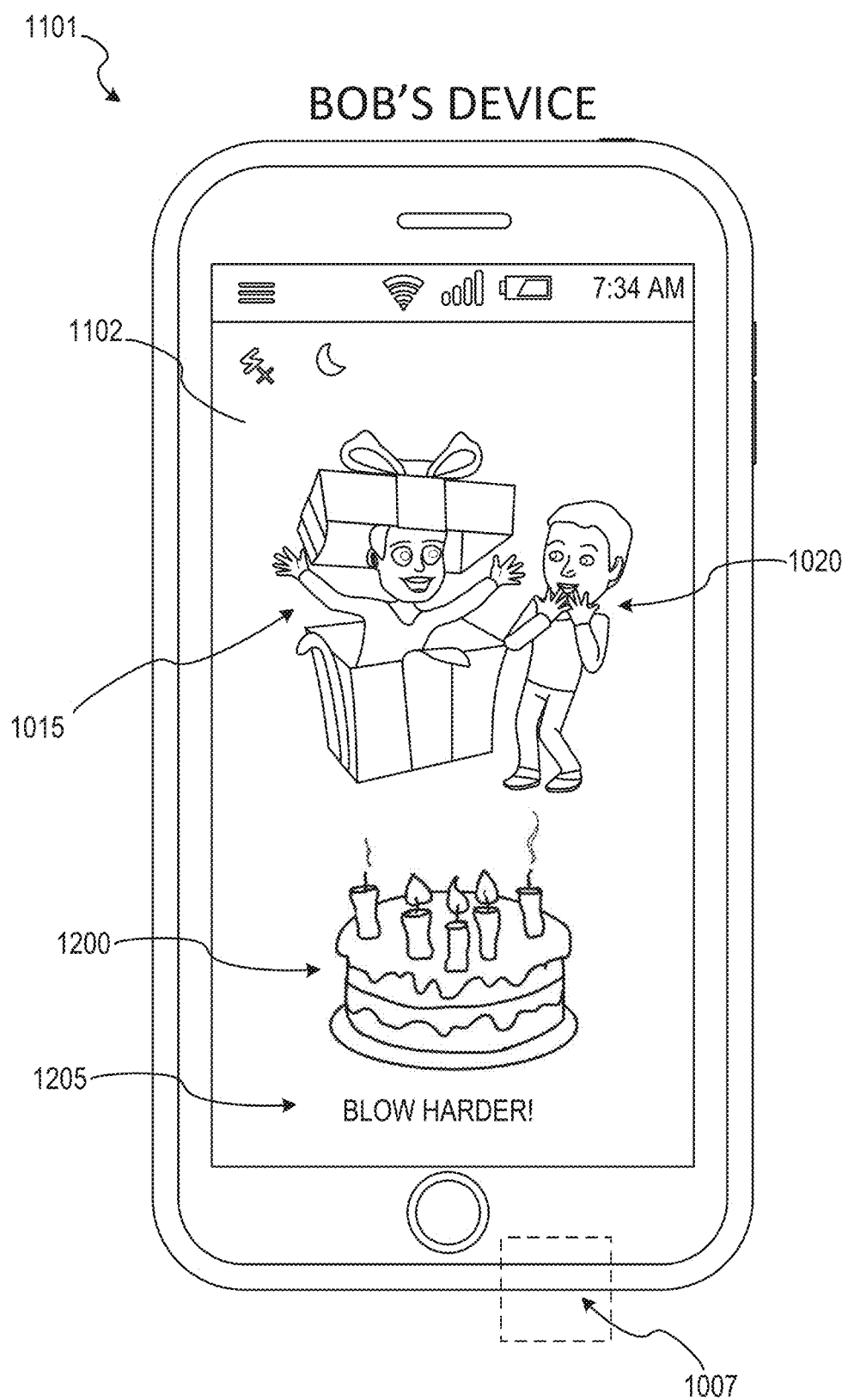

FIG. 12 shows example interactions of an audio response ephemeral message 1102, according to some example embodiments. In response to the second user not blowing hard enough, the updated cartoon cake 1200 is displayed in which some but not all the candles are animated as extinguished. Further in response to the interaction, a new instruction 1205 may prompt the viewing user to blow harder on the cartoon cake 1200 and attempt to extinguish the remaining candles.

Figure 13:
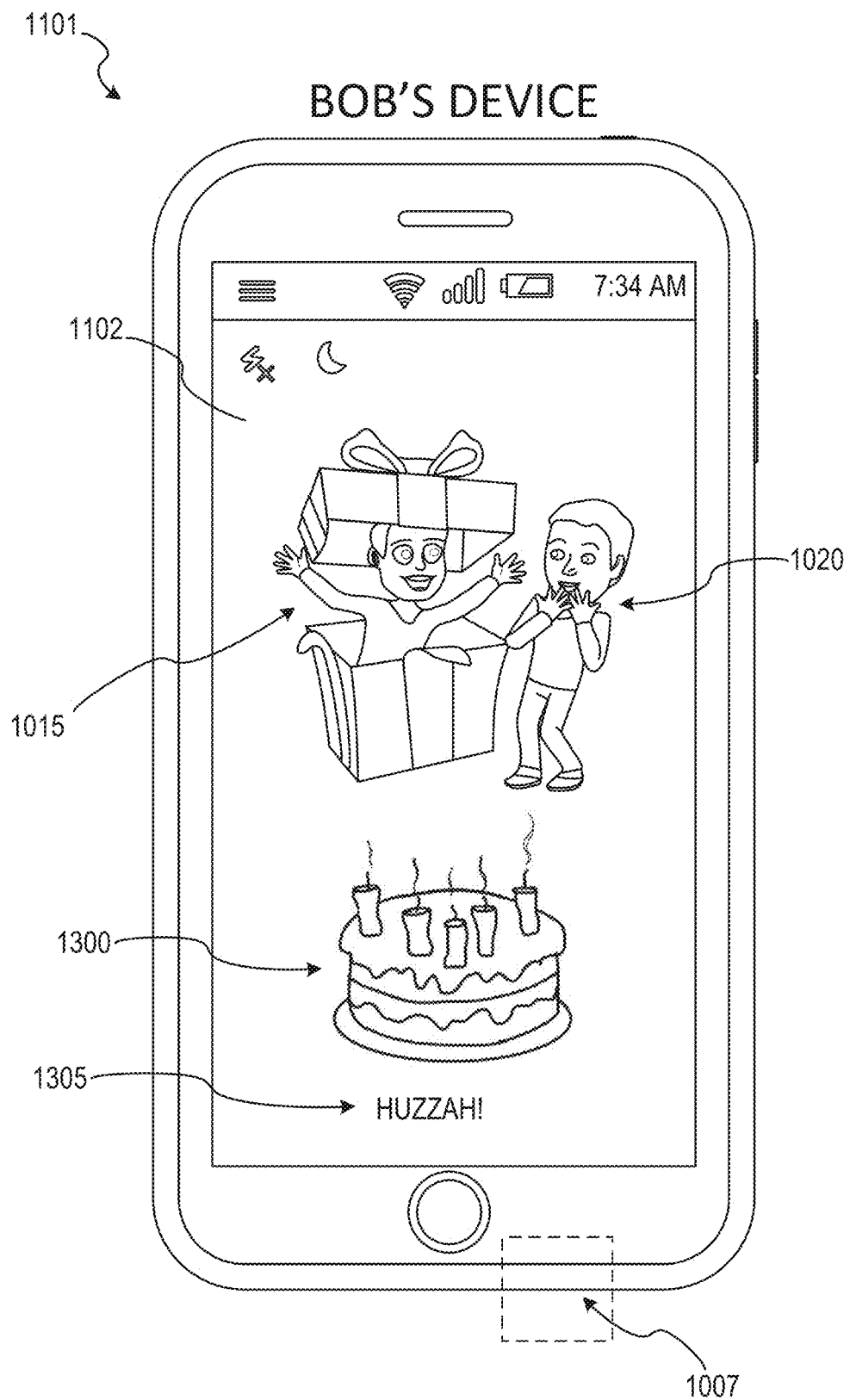

FIG. 13 shows example interactions of an audio response ephemeral message 1102, according to some example embodiments. In the example of FIG. 13, the viewing user blows even harder towards the cartoon cake 1200 (in FIG. 12). The more intense airflow of the harder blow flows over the microphone 1107, which is recorded as noise data that is input into the detection engine 610. In turn, the detection engine 610 then outputs a classification indicating that the user is blowing sufficiently hard (e.g., to trigger final state 950, FIG. 9). In response to the new classification, the response engine 615 updates the audio response ephemeral message 1102 with an updated cartoon cake 1300 in which all the candles are extinguished, and further displays a message 1305 ("Huzzah!") congratulating the viewing user for interacting with the audio response ephemeral message per the instruction 1105 and/or instruction 1205.

Figure 14:
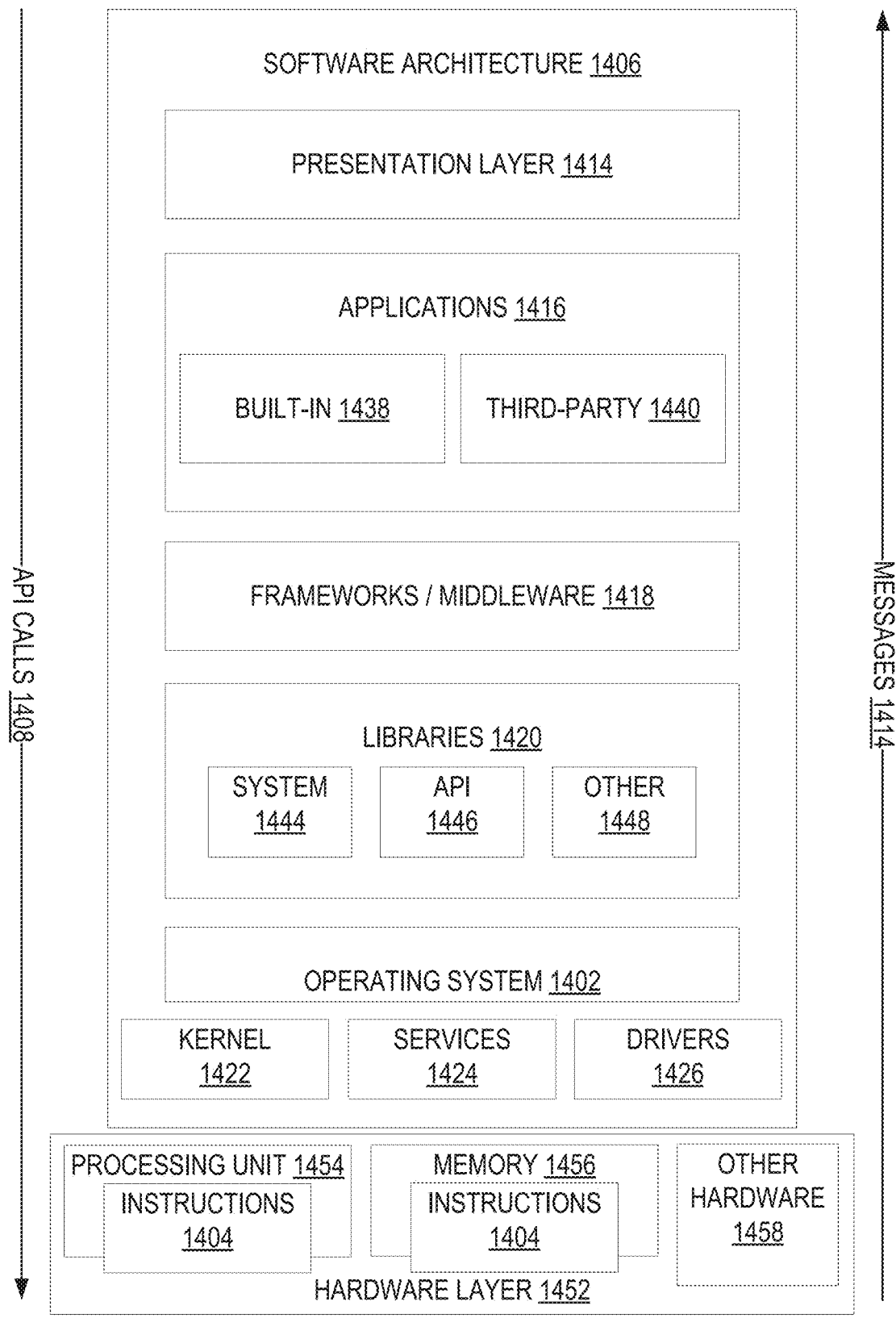
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1400 of FIG. 14 that includes, among other things, processors, memory, and I/O components. A representative hardware layer 1452 is illustrated and can represent, for example, the machine 1400 of FIG. 14. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes a memory/storage 1456, which also has the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke API calls 1408 through the software stack and receive a response in the form of messages 1412. The layers illustrated are representative in nature and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426.

The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, or PNG), graphics libraries (e.g., an OpenGL framework that may be used to render two dimensional (2D) and three dimensional (3D) graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1418 to create user interfaces to interact with users of the system. Alternatively, or additionally, in some systems, interactions with a user may occur through a presentation layer, such as the presentation layer 1414. In these systems, the application/component "logic" can be separated from the aspects of the application/component that interact with a user.

Figure 15:
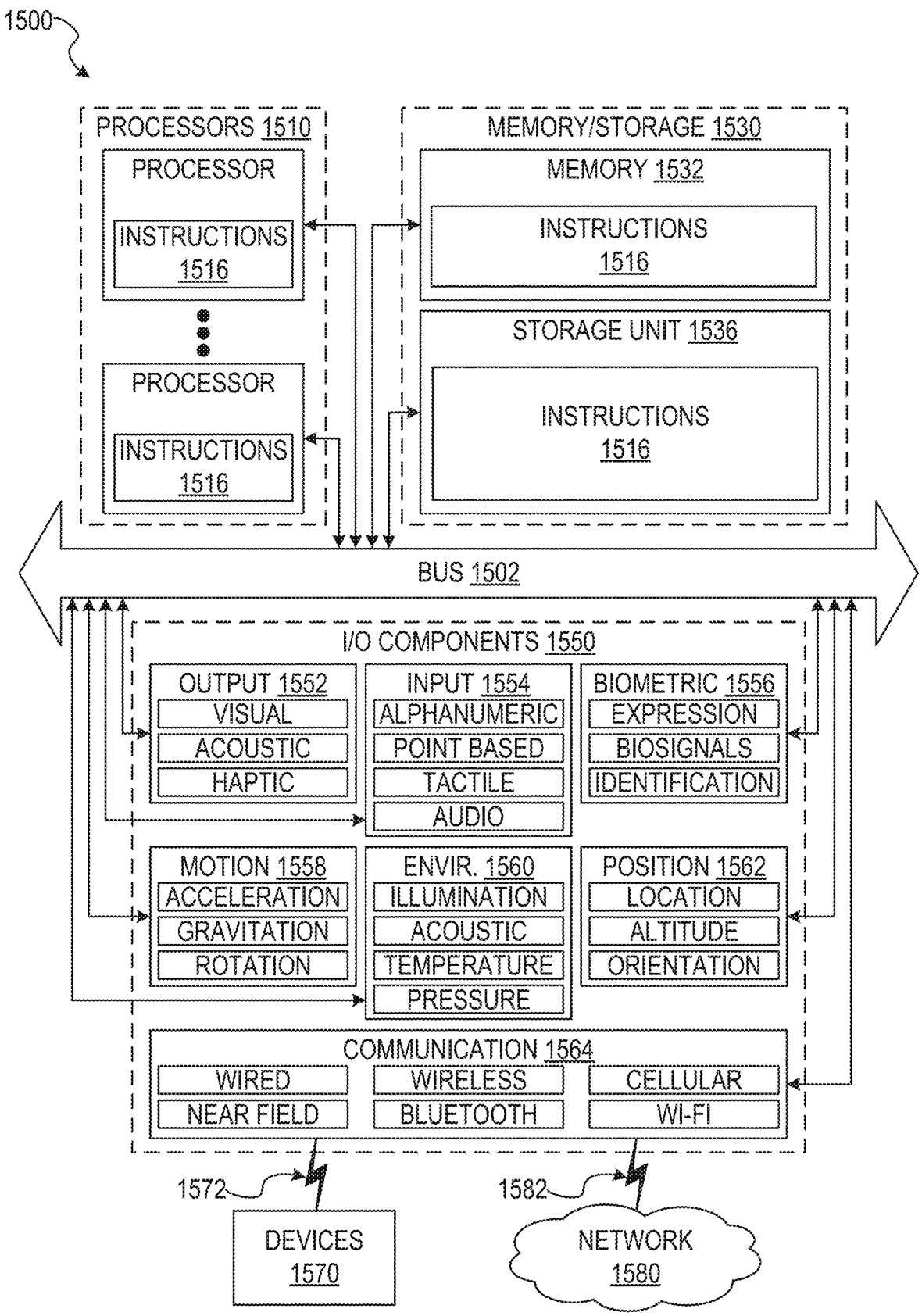
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1516 may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF415, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred (for example, giving date and time of day, sometimes accurate to a small fraction of a second).

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

What is claimed is:

1. A method comprising:
   storing, on a user device, an electronic message comprising an image and content data associated with an audio interaction for the electronic message;
   causing, on a display device of the user device, a presentation displaying the electronic message and an indication to perform the audio interaction with the user device;
   storing, on the user device, visual sound data of sound generated while the electronic message is displayed on the user device, the visual sound data recording an environment of the user device;
   generating a sound classification by applying a convolutional neural network to the visual sound data;
   determining that the visual sound data comprises the audio interaction of the electronic message; and
   displaying the content data on the display device in response to determining that the visual sound data comprises the audio interaction,
   wherein the indication prompts a user of the user device to perform a non-verbal audio interaction, and wherein the convolutional neural network is trained to detect non-verbal sounds.

2. The method of claim 1, wherein the non-verbal audio interaction detected by the convolutional neural network is at least one of:
   blowing air, snapping fingers, clapping hands.

3. The method of claim 1, wherein the convolutional neural network is trained to detect an intensity level of non-verbal sounds.

4. The method of claim 3, further comprising:
   determining, using the convolutional neural network, that the intensity level of the non-verbal audio interaction captured in the visual sound data satisfies a pre-configured intensity level that enables display of the content data.

5. The method of claim 3, further comprising:
   determining, using the convolutional neural network, that the intensity level of the non-verbal audio interaction captured in the visual sound data does not satisfy a pre-configured intensity level that enables display of the content data.

6. The method of claim 5, further comprising:
   in response to the intensity level not satisfying the pre-configured intensity level, prompting performance of the non-verbal audio interaction at an elevated intensity.

7. The method of claim 1, wherein prompting performance comprises displaying a user interface element that prompts performance of the audio interaction.

8. The method of claim 7, wherein the user interface element comprises at least one of: text, an icon, a graphic.

9. The method of claim 1, wherein the content data comprises a reference to image data stored on the user device.

10. The method of claim 1, wherein the user device is a recipient user device and the electronic message is generated by a sender user device.

11. The method of claim 10, wherein the audio interaction is selected, from a plurality of audio interactions, by the sender user device for inclusion in the electronic message to unlock the content data on the recipient user device.

12. The method of claim 1, further comprising:
   recording audio waveform data using a microphone of the user device; and
   converting the audio waveform data into the visual sound data.

13. The method of claim 12, wherein the visual sound data is spectrogram data.

14. A system comprising:
   one or more processors of a machine; and
   a memory storing instructions that, when executed by the one or more processors, cause the machine to perform operations comprising:
   storing an electronic message comprising an image and content data associated with an audio interaction for the electronic message;
   causing a presentation displaying the electronic message and an indication to perform the audio interaction;
   storing visual sound data of sound generated while the electronic message is displayed, the visual sound data recording an environment;
   generating a sound classification by applying a convolutional neural network to the visual sound data;
   determining that the visual sound data comprises the audio interaction captured while the electronic message is displayed; and
   displaying the content data on the display device in response to determining that the visual sound data comprises the audio interaction,
   wherein the indication prompts a user of the user device to perform a non-verbal audio interaction, and wherein the convolutional neural network is trained to detect non-verbal sounds.

15. The system of claim 14, wherein the non-verbal audio interaction detected by the convolutional neural network is at least one of: blowing air, snapping fingers, clapping hands.

16. The system of claim 14, wherein the convolutional neural network is trained to detect an intensity level of non-verbal sounds.

17. The system of claim 16, the operations further comprising:
   determining, using the convolutional neural network, that the intensity level of the non-verbal audio interaction captured in the visual sound data satisfies a pre-configured intensity level that enables display of the content data.

18. A non-transitory machine-readable storage medium embodying instructions that, when executed by a machine, cause the machine to perform operations comprising:
- storing an electronic message comprising an image and content data associated with an audio interaction for the electronic message;
- causing a presentation displaying the electronic message and an indication to perform the audio interaction;
- storing visual sound data of sound generated while the electronic message is displayed, the visual sound data recording an environment;
- generating a sound classification by applying a convolutional neural network to the visual sound data;
- determining that the visual sound data comprises the audio interaction captured while the electronic message is displayed; and
- displaying the content data on the display device in response to determining that the visual sound data comprises the audio interaction,
- wherein the indication prompts a user of the user device to perform a non-verbal audio interaction, and wherein the convolutional neural network is trained to detect non-verbal sounds.

* * * * *